United States Patent
Peng

(10) Patent No.: US 6,221,308 B1
(45) Date of Patent: Apr. 24, 2001

(54) METHOD OF MAKING FIRED BODIES

(75) Inventor: Y. Lisa Peng, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/294,848

(22) Filed: Apr. 20, 1999

(51) Int. Cl.$^7$ ....................................................... B28B 3/22
(52) U.S. Cl. ........................ 264/630; 264/631; 264/638; 264/669; 264/670
(58) Field of Search .................................. 264/629, 630, 264/631, 638, 669, 670

(56) References Cited

U.S. PATENT DOCUMENTS

| | | |
|---|---|---|
| 3,885,977 | 5/1975 | Lachman et al. . |
| 4,758,272 | 7/1988 | Pierotti et al. . |
| 4,992,233 | 2/1991 | Swaroop et al. . |
| 5,427,601 | 6/1995 | Harada et al. . |
| 5,458,834 * | 10/1995 | Faber et al. ........................ 264/109 |
| 5,568,652 | 10/1996 | Wu . |
| 6,077,532 * | 6/2000 | Malkowska et al. ................ 424/457 |
| 6,080,345 * | 6/2000 | Chalasani et al. ................... 264/109 |
| 6,113,829 * | 9/2000 | Bookbinder et al. ........... 264/211.11 |
| 6,132,671 * | 10/2000 | Beall et al. .......................... 264/630 |

FOREIGN PATENT DOCUMENTS

| | | |
|---|---|---|
| 0 336 733 | 10/1989 | (EP) . |
| 99/07652 | 2/1999 | (WO) . |

* cited by examiner

Primary Examiner—Christopher A. Fiorilla
(74) Attorney, Agent, or Firm—Anca C. Gheorghiu; L. Rita Herzfeld

(57) ABSTRACT

A fired body and method for producing the body that involves compounding the components of powder materials, binder, aqueous solvent for the binder, and non-solvent with respect to at least the solvent, binder, and powder materials. The non-solvent is made up of a high molecular weight organic portion having a molecular weight of greater than 200, and a low molecular weight organic portion having a molecular weight of up to 200. The components are mixed and plasticized to form a plasticized mixture which is then shaped to form a green body. The green body is then dried and fired.

13 Claims, No Drawings

METHOD OF MAKING FIRED BODIES

FIELD OF THE INVENTION

This invention relates to a method of making articles by shaping plasticized powder mixtures containing binder, solvent for the binder, component in which the binder is not soluble (non-solvent), followed by firing. Cracking during firing is minimized or eliminated by use of non-solvent composed of special combination of low and high molecular weight organics. Such a combination results in very stiff extrudable batches, minimizes rapid loss of organics during extrusion, reduces the amount of organics entering the firing kiln, and reduces the exothermic load and soot formation of the kiln. As a result, it reduces the cracking of parts during firing.

BACKGROUND OF THE INVENTION

Powder mixtures having a cellulose ether binder are used in forming articles of various shapes. For example ceramic powder mixtures are formed into honeycombs which are used as substrates in catalytic and adsorption applications. The mixtures must be well blended and homogeneous in order for the resulting body to have good integrity in size and shape and uniform physical properties. The mixtures have organic additives in addition to the binders. These additives can be surfactants, lubricants, and dispersants and function as processing aids to enhance wetting thereby producing a uniform batch.

A major and ongoing need in extrusion of bodies from highly filled powder mixtures, especially multicellular bodies such as honeycombs is to extrude a stiffer body without causing proportional increase in pressures. The need is becoming increasingly critical as thinner walled higher cell density cellular structures are becoming more in demand for various applications. Thin walled products with current technology are extremely difficult to handle without causing shape distortion.

Rapid-setting characteristics are important for honeycomb substrates. If the cell walls of the honeycomb can be solidified quickly after forming, the dimension of the greenware will not be altered in subsequent cutting and handling steps. This is especially true for a fragile thin-walled or complex shaped product, or a product having a large frontal area.

Prior rapid stiffening methods involve time-delayed stiffening using rapid set waxes as disclosed, for example in U.S. Pat. No. 5,568,652, and/or applying an external field such as an electrical, ultrasonic, or RF field at the die exit. All of these methods involve extrusion of soft batches. Historically, for highly filled ceramic mixtures, soft batches have lead to better extrusion quality. Attempts to extrude stiffer ceramic batches with the current batch components, i.e cellulose ether binder, lowering the amount of water and/or additives such as sodium tallowate or sodium stearate have not been very successful because of the higher extrusion pressures resulting from collision of finer particles, and the abrasiveness of the materials involved.

The growing need for thinner webs (1–2 mil)/high density cellular products to be extruded to shape necessitates stiffening at the very instant the batch exits the die.

More recently, the above problems have been solved by including more organic materials in the forming mixture such as disclosed in U.S. application Ser. Nos. 09/115,929, 09/116,144, and 60/095,292, among others. However, the organics can pose problems during the firing of the green bodies, due to exothermic reactions that can cause cracking in the bodies, resulting in a weakening structure. This especially true with multicellular structures such as honeycombs. In particular, very thin-walled structures are especially susceptible to cracking during firing.

The present invention fills the need for instantaneous forming of stiff batches which is especially beneficial for extrusion of thin walled honeycombs, and shape retention of extruded bodies at the very instant the batch exits the die, while at the same time providing for minimized exothermic reactions during the firing cycle to reduce the possibility of firing crack formation.

SUMMARY OF THE INVENTION

In accordance with one aspect of the invention, there is provided a method for producing a fired body that involves compounding the components of powder materials, binder, aqueous solvent for the binder, and non-solvent with respect to at least the solvent, binder, and powder materials. The non-solvent is made up of a high molecular weight organic portion having a molecular weight of greater than 200, and a low molecular weight organic portion having a molecular weight of up to 200. The components are mixed and plasticized to form a plasticized mixture which is then shaped to form a green body. The green body is then dried and fired.

In accordance with another aspect of the invention there is provided a fired body produced by the method described above.

DETAILED DESCRIPTION OF THE INVENTION

This invention relates to a method for forming and shaping stiff highly filled plasticized powder mixtures into green bodies that are subsequently fired. By highly filled mixtures is meant a high solid to liquid content in the mixture. For example, the powder material content in the mixture is typically at least about 45% by volume, and most typically at least about 55% by volume. The invention is especially applicable to extrusion of multicellular structures such as honeycombs. This invention relates to a method of making articles by shaping plasticized powder mixtures containing binder, solvent for the binder, component in which the binder is not soluble (non-solvent), followed by firing. Cracking during the firing operation is minimized or eliminated by use of non-solvent composed of special compositions in the forming mixtures. The non-solvent component is made up of a high molecular weight organic portion, that is having a molecular weight of greater than about 200; and a low molecular weight organic portion, that is, having a molecular weight of up to about 200.

The combination of high and low molecular weight non-solvents according to this invention results in dual advantages of stiff extrudates that are strong; and a reduction in intensity of the exothermic reactions occurring during the early part of the firing (binder removal region) by minimizing the organics entering the kiln, reducing the exothermic load of the kiln. As a result, cracking in the body is reduced.

Using only light molecular weight oils such as mineral spirits does not result in good lubrication and stiffness, although the these oils can be driven off during drying. The green strength of the extrudate deteriorates especially when cell wall thickness increases.

Using only waxes poses another set of problems. The mixture must be heated during extrusion, and the extrudate must be quenched to obtain the desired stiffness. Because of the relatively small amount of waxes needed, firing of the extrudate does not pose much of a problem.

The combination of high and low molecular weight portions as the non-solvent offers a number of advantages: (1) a wide compositional window of the two portions of organics provides ideal extrusion mixture for lubrication and stiffness; (2) the low molecular weight portion is easily removed by evaporation such as during drying; (3) the high molecular weight organic, even in a lesser amount than has been used previously, provides adhesion between particles after drying, and facilitates handling of dried parts, and provides a temporary medium for the particles to sinter during the early firing stage. (A dried part with all of the organic removed is often weak and easily disintegrates); (4) the lesser amount of high molecular weight organic results in only a relatively low level of exothermic load. The green bodies can be fired successfully.

Historically, a mixture or batch of a given composition can be made stiff by removing liquids. But extrusion of such stiff batches results in proportional increase in extrusion pressures and torque with enhanced flow defects such as e.g. swollen or deformed webs (in honeycombs). The method of the present invention enables forming e.g. extrusion of a stiff batch without adversely affecting performance such as pressures, torque, and the flow characteristics.

The Powder Material

Typical powders are inorganics such as ceramic, glass ceramic, glass, molecular sieve, metal, or combinations of these.

The invention is especially suitable for use with ceramic, particularly with cordierite and/or mullite-forming raw material powders.

By ceramic, glass ceramic and glass ceramic powders is meant those materials as well as their pre-fired precursors. By combinations is meant physical or chemical combinations, eg., mixtures or composites. Examples of these powder materials are cordierite, mullite, clay, talc, zircon, zirconia, spinel, aluminas and their precursors, silicas and their precursors, silicates, aluminates, lithium aluminosilicates, feldspar, titania, fused silica, nitrides, carbides, borides, eg., silicon carbide, silicon nitride, soda lime, aluminosilicate, borosilicate, soda barium borosilicate or mixtures of these, as well as others.

Especially suited are ceramic materials, such as those that yield cordierite, mullite, or mixtures of these on firing, some examples of such mixtures being about 2% to about 60% mullite, and about 30% to about 97% cordierite, with allowance for other phases, typically up to about 10% by weight. Some ceramic batch material compositions for forming cordierite that are especially suited to the practice of the present invention are those disclosed in U.S. Pat. No. 3,885,977 which is herein incorporated by reference as filed.

In accordance with a preferred embodiment, one composition which ultimately forms cordierite upon firing is as follows in percent by weight, although it is to be understood that the invention is not limited to such: about 33 to about 41, and most preferably about 34–40 of aluminum oxide, about 46–53 and most preferably about 48–52 of silica, and about 11–17 and most preferably about 12–16 magnesium oxide.

The powders can be synthetically produced materials such as oxides, hydroxides, etc, or they can be naturally occurring minerals such as clays, talcs, or any combination of these. The invention is not limited to the types of powders or raw materials. These can be chosen depending on the properties desired in the body.

Some typical kinds of powder materials are given below. The particle size is given as median particle diameter by Sedigraph analysis, and the surface area is given as $N_2$ BET surface area.

Some types of clay are non-delaminated kaolinite raw clay, such as Hydrite MP™ clay, or Hydrite PX™ clay, delaminated kaolinite, such as KAOPAQUE-10™ (K10) clay, and calcined clay, such as Glomax LL. All of the above named materials are sold by Dry Branch Kaolin, Dry Branch, Georgia.

Some typical kinds of talc are those having a surface area of about 5–8 $m^2/g$, such as supplied by Barretts Minerals, under the designation MB 96–67.

Some typical aluminas are coarse aluminas, for example, Alcan C-700 series, such as C-701, or fine aluminas such as A-16SG from Alcoa.

One typical kind of silica is that having a particle size of about 9–11 micrometers, and a surface area of about 4–6 $m^2/g$, such as IMSIL™ sold by Unimin Corporation.

In filter applications, such as in diesel particulate filters, it is customary to include a burnout agent in the mixture in an amount effective to subsequently obtain the porosity required for efficient filtering. A burnout agent is any particulate substance (not a binder) that burns out of the green body in the firing step. Some types of burnout agents that can be used, although it is to be understood that the invention is not limited to these, are non-waxy organics that are solid at room temperature, elemental carbon, and combinations of these. Some examples are graphite, cellulose, flour, etc. Elemental particulate carbon is preferred. Graphite is especially preferred because it has the least adverse effect on the processing. In an extrusion process, for example, the rheology of the mixture is good when graphite is used. Typically, the amount of graphite is about 10% to about 30%, and more typically about 15% to about 30% by weight based on the powder material.

Molecular sieves can also be shaped into bodies in accordance with this invention. Molecular sieves are crystalline substances having pores of size suitable for adsorbing molecules. The molecular sieve can be in the crystallized form or in the ammonium form or hydrogen form, or ion-exchanged with or impregnated with a cation. The molecular sieves can be provided in ion exchanged form or impregnated with cations either before forming into a body or after the product body has formed. The ion-exchange and impregnation methods are well known processes. Such treatments are within the scope of this invention.

Some types of molecular sieves which are preferred for the practice of the present invention are carbon molecular sieves, zeolites, metallophosphates, silicoaluminophosphates, and combinations of these. Carbon molecular sieves have well defined micropores made out of carbon material.

The molecular sieves that are especially suited to the invention are the zeolites. Some suitable zeolites are pentasil, such as ZSM-5, Y, such as ultrastable Y, beta, mordenite, X, such as 13X, or mixtures thereof.

Any sinterable metal or metal composition can be used in the practice of the present invention. Especially suited are iron group metal, chromium, and aluminum compositions, with the preferred iron group metal being iron. Especially preferred is Fe, Al, and Cr. For example, Fe5-20Al5-40Cr, and Fe7-10Al10-20Cr powders with other possible additions are especially suited. Some typical compositions of metal powders are disclosed in U.S. Pat. Nos. 4,992,233, 4,758,272, and 5,427,601 which are herein incorporated by reference as filed. U.S. Pat. No. 4,992,233 relates to methods of producing porous sintered bodies made from metal powder compositions of Fe and Al with optional additions of Sn, Cu, and Cr. U.S. Pat. No. 5,427,601 relates to porous sintered bodies having a composition consisting essentially of in percent by weight about 5–40 chromium, about 2–30 aluminum, 0-about 5 of special metal, 0-about 4 of rare earth oxide additive and the balance being iron group metal, and unavoidable impurities such as eg., Mn or Mo, with the preferred iron group metal being iron. When rare earth oxide is present, the special metal is at least one of Y, lanthanides, Zr, Hf, Ti, Si, alkaline earth metal, B, Cu, and Sn. When no rare earth oxide is present, the special metal is at least one of Y, lanthanides, Zr, Hf, Ti, Si, and B, with optional additions of alkaline earths, Cu, and Sn.

In general, the powder material is fine powder (in contrast to coarse grained materials) some components of which can either impart plasticity, such as clays, when mixed with water for example, or which when combined with the organic binder can contribute to plasticity.

The weight percents of the binder, solvent, and non-solvent are calculated as superadditions with respect to the non-organic solids by the following formula:

$$\frac{\text{weight of binder, solvent, non-solvent, or other additives}}{\text{weight units of powder materials}} \times 100.$$

The Binder

The function of the binder is to bind the inorganic powders and impart plasticity to the batch when mixed with a solvent. The preferred binders used in this invention are cellulose ethers.

Some typical cellulose ether binders according to the present invention are methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose, or combinations of these being preferred. Preferred sources of cellulose ethers are Methocel A4M, F4M, F240, and K75M celloluse products from Dow Chemical Co. Methocel A4M cellulose is a methylcellulose. Methocel F4M, F240, and K75M cellulose products are hydroxypropyl methylcellulose.

The organic binder makes up typically about 2–12% by weight, and more typically about 4–10% by weight of the powder materials.

The Solvent

The solvent provides a medium for the binder to dissolve in thus providing plasticity to the batch and wetting of the powders. The solvent is aqueous based: normally water or water-miscible solvents. The solvents provide hydration of the binder and powder particles.

The Non-solvent

The non-solvent is non-solvent relative to at least the binder, the solvent, and the powder materials. Partial solubility of cellulose ether binders in the non-solvent would result in increase of viscosity of the non-solvent, and loss of lubricating properties needed to shape a stiff batch. This would result in an increase in shaping pressures and torques. The function of the non-solvent is to provide the fluidity necessary for shaping, while maintaining the strength of the binder in the solvent. The non-solvent can have dissolved surfactants, secondary binders, lubricants, and additives that enhance the rheological performance. The amount of dissolved substances should be so as to not to adversely impact the rheology of the mixture. Such a system is disclosed in U.S. patent applications Ser. No. 09/115,929 now U.S. Pat. No. 6,113,829 and Ser. No. 09/116,144 now U.S. Pat. No. 6,080,345 and which are herein incorporated by reference.

In case of an aqueous binder system, the non-solvent is hydrophobic relative to binder in the solvent e.g. water. One preferred binder-solvent combination is cellulose ether in water. In this combination, the non-solvent hydrophobically associates through the methyoxy substituent of the binder. This combination is especially advantageous for cordierite and/or mullite-forming raw material powders.

With aqueous-based binder solvents, such as water, non solvents can be chosen from both synthetic and natural substances.

The current application relates to a new concept of non-solvent systems with particular attention on the their ease of removal during later processing after extrusion, in addition to their ability to impart stiffness and green strength at the die exit.

The low molecular weight organic portion can be common organic solvents, such as pentane, hexane, heptane, octane, decane, methanol, ethanol, propanol, and acetone or the mixture of them. Paraffinic solvents or mixtures such as heptane, octane, and/or decane, etc, are preferred. It is also preferred that the low molecular weight portion have a boiling point that is higher than water but lower than 150° C. This can help minimize the weight loss during compounding of the mixture and during extrusion.

The high molecular weight organic portion can be of various types or combinations. It can be heavy petroleum fractions, such as lube oil, fuel oil and low melting waxes such as those waxes having a melting point of about 40° C. to 80° C. It can also be thermoplastic polymers that can dissolve into the low molecular weight fraction, such as polyethylene glycols of various molecular weight. It can also be waxy/liquid antioxidants, for example, high molecular weight hindered phenols, aromatic amines, and organosulfur and phosphorous compounds. Antioxidants can be included in the mixture to achieve desired extrudate properties. Such antioxidants are disclosed in U.S. application Ser. No. 60/095,292 which is herein incorporated by reference. The mixtures thus prepared would therefore have the advantages of the antioxidants as disclosed. The high molecular weight portion can also be hydrogenated coal liquids obtained from coal processing, such as pyrolysis and liquefaction. These are usually deeply hydrotreated and contain a significant amounts of conjugated naphthenic rings. The high molecular weight portion can also be any proportion of each category mentioned above.

Some especially suitable low and high molecular weight organic portions are decane with wax having a melting point of about 40° C. to 80° C., high molecular weight hindered phenols, aromatic amines, organosulfur compounds, and/or phosphorous compounds.

The high molecular weight fraction is miscible with or dissolved into the low molecular portion to achieve a desired viscosity suitable for using as a non-solvent for shaping, such as extrusion. The viscosity is preferably about 70 to 500 cp, and preferably about 80 to 200 cp at room temperature. The final mixture must have the proper hydrophobicity characteristics relative to the other components in the batch to ensure desired rheology and extrusion pressure. When mixed with the inorganic powders and other components the binders and solvents form extrudable stiff batches.

The resulting stiff batch is then shaped into a green body by any known method for shaping plasticized mixtures, such as e.g. extrusion, injection molding, slip casting, centrifugal casting, pressure casting, dry pressing, etc. The invention is best suited for extrusion through a die.

The extrusion operation can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die. The extrusion can be vertical or horizontal.

The total extrusion pressure through the die is composed of the pressure to enter the die and the pressure drop through the die. The higher entrance pressure due to the stiff batch is offset by a much larger pressure drop through the die. As a result, the total extrusion pressure through the die is no greater than it would be in historic batches.

As the stiff batch is passed through the extruder and the die, the film of lubricating fluid in the inter-particle region and at the interface between the batch and the extruder/die wall provides the lubrication necessary to maintain a lower total extrusion pressure for a stiff batch. If the mixing process is not high shear, plasticization will occur during extrusion through the die because of high shear through the die, e.g. in forming a honeycomb, through the slots and holes.

The lubrication provided by the non-solvent enables the stiff batch to slip at the wall of the die/extruder. As the stiff batch is extruded, at points of high shear through the die, the non-solvent is partially squeezed out of the batch to the interface between the batch and the wall of the die/extruder. The driving force for the preferential migration of the non-solvent versus solvent to the interface is due to (1) the viscosity of the non-solvent being significantly lower than the viscosity of the binder-solvent gel or mixture, (2) the non-solvent being incompatible with the solvent, i.e. hydrophobic relative to it in the case of aqueous based solvents, and (3) the solvent being held by the binder and inorganics by hydration as opposed to the non-solvent which is free to migrate.

The bodies of this invention can have any convenient size and shape and the invention is applicable to all processes in which plastic powder mixtures are shaped. The process is especially suited to production of cellular monolith bodies such as honeycombs. Cellular bodies find use in a number of applications such as catalytic, adsorption, electrically heated catalysts, filters such as diesel particulate filters, molten metal filters, regenerator cores, etc.

Generally honeycomb densities range from about 235 cells/cm$^2$ (1500 cells/in$^2$) to about 15 cells/cm$^2$ (100 cells/in$^2$). Examples of honeycombs produced by the process of the present invention, although it is to be understood that the invention is not limited to such, are those having about 94 cells/cm$^2$ (about 600 cells/in$^2$), or about 62 cells/cm$^2$ (about 400 cells/in$^2$) each having wall thicknesses of about 0.1 mm (4 mils). Typical wall thicknesses are from about 0.07 to about 0.6 mm (about 3 to about 25 mils), although thicknesses of about 0.02–0.048 mm (1–2 mils) are possible. The method is especially suited for extruding thin wall/high cell density honeycombs.

The intrinsic material stiffness or wet green strength of this invention is typically about 2–2.5 times greater than with historic mixtures.

Stiffening is important for honeycombs having a large frontal area. For example, honeycombs of typically about 12.7–22.9 cm (5–9") diameter and lower cell density and very thin walls, e.g. 0.07–0.12 mm (3–5 mils) are more vulnerable to deformation as they leave the extrusion die. In accordance with this invention, there is no cell distortion at the perimeter, and there is significant improvement in shape. Therefore the rapid stiffening effects of the present invention are especially advantageous for those types of structures.

In addition to the stiffness of the batches, another important advantage of this invention is that there is improved shape retention of the green body. Shape retention is especially advantageous in forming complex structures. Shape of thin-wall cellular substrates e.g. 3–6 mil or less, is maintained typically at 2–2.5 times the feed rates for twin screw extrusion and higher extrusion velocities for ram extrusion.

Another advantage of the invention is that it decreases the wear on the extrusion die, and screw elements, thus extending their life.

The green body can then be dried and fired according to known techniques except that drying times will be shorter due to less water in the green body. Also, less drying energy is required than for historic batches. This is especially advantageous in dielectric drying operations.

The firing conditions of temperature and time depend on the composition and size and geometry of the body, and the invention is not limited to specific firing temperatures and times. For example, in compositions which are primarily for forming cordierite, the temperatures are typically from about 1300° C. to about 1450° C., and the holding times at these temperatures are from about 1 hour to about 6 hours. For mixtures that are primarily for forming mullite, the temperatures are from about 1400° C. to about 1600° C., and the holding times at these temperatures are from about 1 hour to about 6 hours. For cordierite-mullite forming mixtures which yield the previously described cordierite-mullite compositions, the temperatures are from about 1375° C. to about 1425° C. Firing times depend on factors such as kinds and amounts of materials and nature of equipment but typical total firing times are from about 20 hours to about 80 hours. For metal bodies, the temperatures are about 1000° C. to 1400° C. in a reducing atmosphere preferably hydrogen. Firing times depend on factors as discussed above but are typically at least 2 hours and typically about 4 hours. For zeolite bodies, the temperatures are about 400° C. to 1000° C. in air. Firing times depend on factors as discussed above but are typically about 4 hours.

Without wishing to be bound by theory, it is believed that utilizing mixtures of low and high molecular weight portion as the non-solvent make-up would have the advantages of reducing the possibility of cracking, due to less organic materials entering the kiln. The low molecular weight portion can be flashed-off or solvent extracted before firing. This in-turn reduces the exotherm load and differential temperature of the parts. Even if some of the low molecular weight portion remains in the green body, it tends to vaporize because of the low boiling point. There is also inherent advantage of allowing a small amount of organics to remain in the green body. The green body can be stronger and easy to handle, especially in the case of thin walled (1–2 mil) honeycomb processing. Completely dried parts are easily chipped and peeled. The small amount of heavy organic portion left after the drying acts as extra binder and also allows for structural reorganization (shrinkage) at the early period of firing cycle.

To more fully illustrate the invention, the following non-limiting examples are presented. All parts, portions, and percentages are on a weight basis unless otherwise stated.

EXAMPLE 1

The inorganic powders are ground and homogenized, and blended together. The binder, methylcellulose is then added, followed by addition of water. The amount of water used is about 23.5%. Mixture of decane and wax is then prepared and viscosity adjusted to 100 cp. The oily mixture is then added to the above powder-solvent mixture.

The mixture is then introduced into a torque rheometer for a few minutes. The torque experienced is recorded as time elapsed. Peak torque is typically observed at about 1 minute. After 4 minutes elapsed, the material is taken out and cut into small pieces for uniform compaction and air removal in an instrument such as Instrum. These pieces are then compacted for a few more minutes after peak compaction pressure is observed. Rods and one ribbon are then extruded. The extrudate has high stiffness and low extrusion pressure compared to the standard batches without the presence of non-solvent. The low molecular weight portion of the non-solvent is then driven off during the drying of the parts. The exothermic load for the parts thus prepared is only 35% of the total heat released by all the hydrocarbons present in the batch.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method for producing a fired body, the method comprising:
   a) compounding components comprising
      i) powder materials,
      ii) binder,
      iii) aqueous solvent for the binder,
      iv) non-solvent with respect to at least the solvent, binder, and powder materials, wherein the non-solvent comprises a high molecular weight organic portion having a molecular weight of greater than about 200, and a low molecular weight organic portion having a molecular weight of up to about 200;
   b) mixing and plasticizing said components to form a plasticized mixture;
   c) shaping the plasticized mixture to form a green body; and
   d) drying the green body; and
   e) firing the green body to produce a fired body.

2. A method of claim 1 wherein the high molecular weight portion is selected from the group consisting of heavy petroleum fractions, thermoplastic polymers, high molecular weight hindered phenols, aromatic amines, organosulfur compounds, phosphorous compounds, hydrogenated coal liquids, and combinations thereof.

3. A method of claim 2 wherein the heavy petroleum fractions are selected from the group consisting of lube oil, fuel oil, wax having a melting point of about 40° C. to 80° C., and combinations thereof.

4. A method of claim 1 wherein the low molecular weight portion is one or more paraffinic solvents.

5. A method of claim 4 wherein the paraffin solvents are selected from the group consisting of heptane, octane, decane, and combinations thereof.

6. A method of claim 1 wherein the low molecular weight portion has a boiling point at least as high as the boiling point of water but lower than about 150° C.

7. A method of claim 1 wherein the low molecular weight portions and high molecular weight portions are selected to yield a combined viscosity of about 70 to 500 cp.

8. A method of claim 7 wherein the combined viscosity of the low and high molecular weight portions is about 80 to 200 cp.

9. A method of claim 1 wherein the low molecular weight portion is decane, high molecular weight portion is selected from the group consisting of wax having a melting point of about 40° C. to 80° C., high molecular weight hindered phenols, aromatic amines, organosulfur compounds, phosphorous compounds, and combinations thereof.

10. A method of claim 1 wherein the powder materials are cordierite-forming raw materials.

11. A method of claim 1 wherein the shaping is done by passing the mixture through an extruder and then through a die to form a green extrudate.

12. A method of claim 11 wherein the mixture is plasticized within and extruded from a twin screw extruder.

13. A method of claim 11 wherein the mixture is extruded into a honeycomb structure.

* * * * *